United States Patent
Coyne et al.

[11] Patent Number: 5,831,837
[45] Date of Patent: Nov. 3, 1998

[54] SWITCH MODE POWER SUPPLY

[75] Inventors: David Coyne, Glenrothes; David Alexander Grant, Glasgow; Ewan James Lister, Hampshire; Lindsay Gordon Taylor, Renfrewshire, all of United Kingdom

[73] Assignee: International Business Machines Corporation, Armonk, N.Y.

[21] Appl. No.: 860,041

[22] PCT Filed: Sep. 18, 1995

[86] PCT No.: PCT/GB95/02205

§ 371 Date: Jun. 9, 1997

§ 102(e) Date: Jun. 9, 1997

[87] PCT Pub. No.: WO96/27232

PCT Pub. Date: Sep. 6, 1996

[30]       Foreign Application Priority Data

Feb. 28, 1995 [GB] United Kingdom ............... 9503987

[51] Int. Cl.[6] ............................................. H02M 3/335
[52] U.S. Cl. .................................... 363/21; 363/97
[58] Field of Search ...................... 363/17, 18, 20,
363/21, 97, 98, 131, 132; 323/282, 285,
286, 287; 315/408, 411

[56]              References Cited

U.S. PATENT DOCUMENTS

| 4,641,064 | 2/1987 | Testin et al. ........................ 315/411 |
|---|---|---|
| 4,885,674 | 12/1989 | Varga et al. .......................... 363/21 |
| 4,901,215 | 2/1990 | Martin-Lopez ....................... 363/21 |
| 4,933,829 | 6/1990 | White .................................. 363/95 |
| 4,975,820 | 12/1990 | Szepesi .............................. 363/21 |
| 5,001,620 | 3/1991 | Smith .................................. 363/89 |
| 5,351,177 | 9/1994 | Megeid ............................... 363/21 |
| 5,469,029 | 11/1995 | Jackson et al. ................... 315/408 |
| 5,475,579 | 12/1995 | John et al. .......................... 363/21 |

FOREIGN PATENT DOCUMENTS

| 1 309 662 | 3/1973 | United Kingdom . |
|---|---|---|
| 2 216 689 | 10/1989 | United Kingdom . |

*Primary Examiner*—Adolf Berhane
*Attorney, Agent, or Firm*—Scully, Scott, Murphy and Presser

[57]                ABSTRACT

A switch mode power supply comprises: a transformer (T1). A switch (Q4) alternately opens and closes a current path through a primary winding (L1) of the transformer in response to a pulse switching signal. An oscillator (110) generates the switching signal and synchronises the switching signal to a synchronisation signal (HSYNC') from an external source. A pulse width modulator (140) varies the pulse width of the switching signal in dependence upon a feedback signal indicative of a load on the power supply. A current limiter (150) turns off the switch to close the current path in response to current in the primary winding exceeding a threshold. Compensation means (160) is provided for varying the threshold in dependence upon the frequency of the synchronisation signal.

8 Claims, 4 Drawing Sheets

SWITCH MODE POWER SUPPLY

BACKGROUND OF THE INVENTION

1. Technical Field

The present invention relates to a switch mode power supply for operation at a range of frequencies.

2. Prior Art

Switch mode power supplies, or DC to DC convertors as they are sometimes referred to, are used in electrical appliances, such as television receivers and computer visual display units for example, to efficiently transfer electrical power from the domestic electricity mains supply to electrical circuitry of the appliances.

A typical current mode SMPS comprises a switch for alternately opening and closing a current path through the primary winding of a transformer in response to a square wave switching signal. In operation, a DC voltage is applied across the primary winding of the transformer. Electrical energy is transferred to a load connected to the secondary winding of the transformer by alternately opening and closing the switch as a function of the switching signal. The amount of electrical energy transferred to the load is a function of the duty cycle of the switch and the frequency of the switching signal. The duty cycle of the switch is the ratio of the time for which the switch is open relative to the time for which the switch is closed. The duty cycle thus corresponds to the mark-space ratio of the switching signal. An oscillator generates the switching signal. A pulse width modulator is connected to the output of the oscillator for varying the mark-space ratio of the switching signal to vary the duty cycle of the switch as a function of a feedback signal from the load. The feedback signal from the load completes a negative feedback loop enabling the controller to regulate the power supplied to the load in accordance with the power demanded by the load, thereby leading to efficient energy usage. The power available to the load is limited by sensing the current in the primary winding of the transformer and turning off the switch in the event of the peak primary current exceeding a predetermined threshold. Because power is proportional to the square of the current, this gives effective power limiting.

In many electrical appliances the switching signal is synchronised by the oscillator to a synchronisation signal in the interests of, for example, noise immunity. For example, in a raster-scanned cathode ray tube (CRT) display, such as a television receiver or a computer visual display unit, the switching signal is usually synchronised to the raster line scan signal of the display. There is an increasing requirement for CRT displays to operate within a range of different video synchronisation frequencies so that a range of different picture formats can be presented on the same display screen. It is therefore not unusual for such CRT displays to be required to operate in range of line scan frequencies extending from 31.5 kHz to 64 Khz, for example. However, the amount of power deliverable by a conventional switch mode power supply for such a display, the "power throughput", is directly proportional to the frequency of the switching signal for a given level of current in the primary winding. In a failure condition, such as a short circuit of the secondary windings, the power throughput can be excessive without necessarily invoking current limiting in the primary winding because of a high frequency of operation. Such excessive power throughput causes a temperature rise in the transformer. In the interests of safety, it is therefore desirable to base the design of such a conventional power supply on the maximum power level that the supply can deliver. Note for example that a typical SMPS which is designed to limit at 100 W at 31.5 kHz may not power limit below 200 W at 64 kHz. In particular, it is desirable in conventional power supplies to include a transformer which is sufficiently large to dissipate the power throughput under the above mentioned failure conditions. However, this a leads to an increase in transformer size for each increase in the frequency range of operation of the power supply.

SUMMARY OF INVENTION

In accordance with the present invention, there is now provided a switch mode power supply comprising: a transformer; a switch for alternately opening and closing a current path through a primary winding of the transformer in response to a pulse switching signal; an oscillator for generating the switching signal and for synchronising the switching signal to a synchronisation signal from an external source; a pulse width modulator for varying the pulse width of the switching signal in dependence upon a feedback signal indicative of a load on the power supply; a current limiter for turning off the switch to close the current path in response to current flowing in the-primary winding exceeding a threshold; and compensation means for varying the threshold in dependence upon the frequency of the synchronisation signal.

The present invention is based on a realisation that the maximum available power throughput in a switch mode power supply can be held substantially constant over a range of operating frequencies by applying a DC bias proportional to the operating frequency of the supply to the current limiter of the supply. The DC bias forces the current path through the primary winding of the supply to be turned off at progressively lower primary currents as the operating frequency is increased, thereby maintaining substantially constant power limiting across the range of operating frequencies. The switch mode power supply of the present invention can therefore use a much smaller transformer than that required in conventional supplies operating in the same frequency range because the present invention alleviates the requirement of a transformer capable of dissipating excess power at higher frequencies. Because, in accordance with the present invention, the power limit is maintained substantially constant over the operating range of frequencies, the reliability of the power supply is improved.

BRIEF DESCRIPTION OF THE DRAWINGS

A preferred embodiment of the present invention will now be described with reference to the accompanying drawings, in which.

DETAILED DESCRIPTION OF THE PREFERRED EMBODIMENTS OF THE INVENTION

Figure 1:
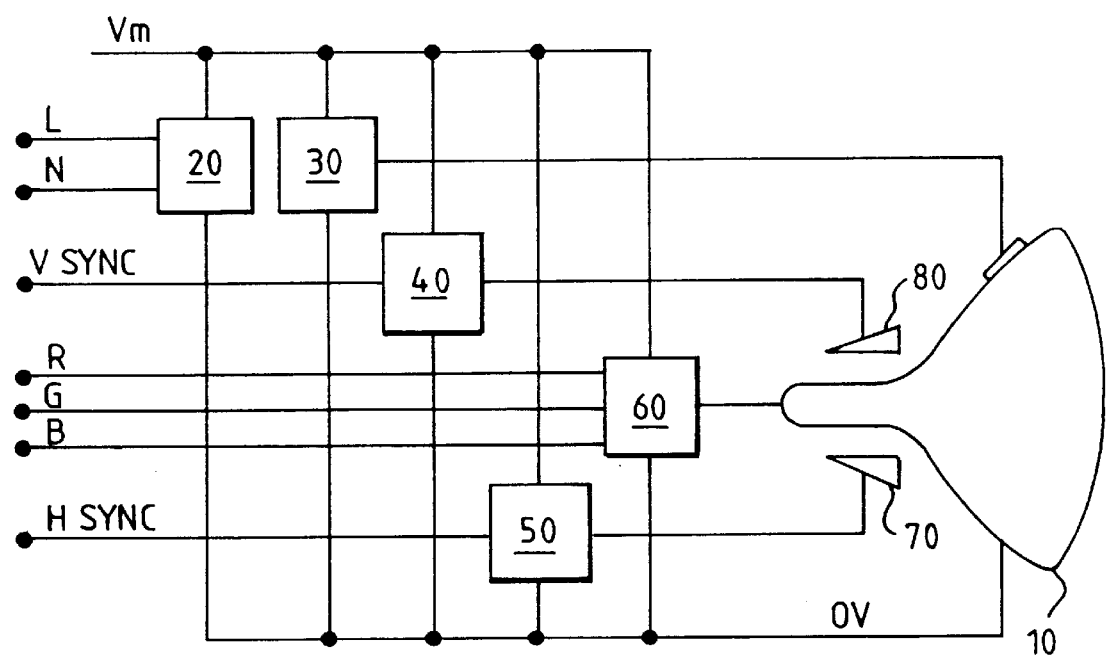
FIG. 1 is a block diagram of a CRT display device.

Referring first to FIG. 1, a raster-scanned CRT display capable of operating in a range of different line and frame scan frequencies to display images in a range of picture formats comprises a Cathode Ray Tube (CRT) 10 connected to an Extra High Tension voltage (EHT) generator 30 and a video amplifier 60. Line and frame deflection coils, 80 and 70 respectively, are disposed around the neck of the CRT 10. Deflection coils 80 and 70 are connected to line and frame scan circuits, 40 and 50, respectively. A switch mode power supply (SMPS) 20 is connected via power supply rails Vm and 0 V to the EHT generator 30, video amplifier 60 and scan circuits 40 and 50.

In operation, EHT generator 30 generates an electric field within CRT 10 for accelerating electrons in beams towards the screen of CRT 10. Line and frame scan circuits 40 and 50 generate line and frame scan currents in deflection coils 70 and 80. The line and frame scan currents are in the form of ramp signals to produce time-varying magnetic fields that scan the electron beams across CRT screen 10 in a raster pattern. The line and frame scan signals are synchronised by line and frame scan circuits 50 and 40 to input line and frame sync signals, HSYNC and VSYNC, generated by a host computer system (not shown) for example. The line and frame sync signals may vary in frequency depending on the video picture format generated by the computer system. The line sync signal, for example, typically varies in the range 31.5 kHz to 64 kHz depending on the video picture format. Video amplifier 60 modulates the electron beams to produce an output display on CRT 10 as a function of input video signals, R, G and B, also generated by the host computer system.

Figure 2:
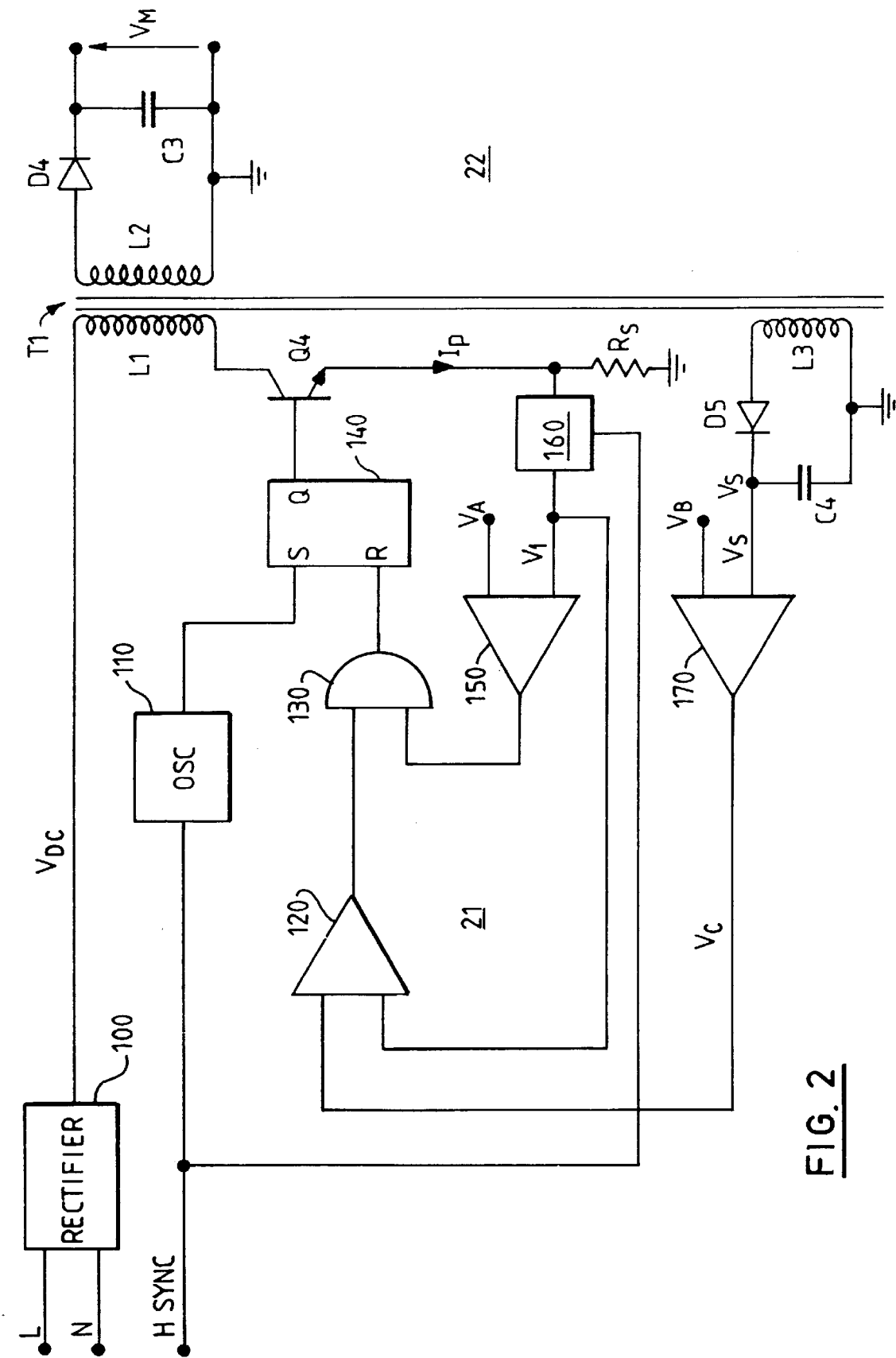
FIG. 2 is a block diagram of a switch mode power supply for the display device.

Referring now to FIG. 2, in a preferred example of the present invention, SMPS 20 comprises a primary side 21 and a secondary side 22 linked by a transformer T1. The primary side 21 has current mode flyback switching topology. T1 comprises a primary winding L1, a feedback winding L3, and a secondary winding L2.

Primary winding L1 is connected at one end via a DC input rail $V_{DC}$ to the output of a rectifier 100 and at the other end to the collector of a bipolar transistor switch Q4. Rectifier 100 is connected to the Live L and Neutral N lines of the domestic AC mains electricity supply. It will be appreciated from the following that, in other embodiments of the present invention, Q4 may be implemented by a field effect transistor instead of a bipolar transistor. The emitter of Q4 is connected a reference level via a sense resistor $R_s$. The base of Q4 is connected to the output Q of a set-reset (SR) latch 140. The set input S of latch 140 is connected to the output of an oscillator 110. The reset input R of latch 140 is connected to the output of a two input AND gate 130. The inputs to AND gate 130 are connected to the output of a Pulse width Modulation (PWM) comparator 120 and the output of a sense comparator 150. Oscillator 110 has a synchronisation input connected to receive a synchronisation signal HSYNC'. PWM comparator 120 has a first comparison input connected to the output of an error amplifier 170 and a second comparison input connected to the output $V_1$ of a current sense circuit 160. Sense comparator 150 has a first comparison input connected to a reference voltage $V_a$ and a second comparison input connected to the output $V_1$ of current sense circuit 160. A first input to current sense circuit 160 is connected to the junction of Q4 emitter and $R_s$. A second input to current sense circuit 160 is connected to receive synchronisation signal HSYNC'. Error amplifier 170 has a first input connected to a reference voltage $V_b$ and second input connected to receive a DC feedback voltage $V_s$ from feedback winding L3 in combination with a diode D5 and a smoothing capacitor C4.

In operation, DC input rail $V_{DC}$ carries DC-rectified mains power from rectifier 100. The DC rectified mains power is supplied from the domestic electricity mains power supply.

Oscillator 110 generates a square wave switching signal at its output which is transferred via latch 140 to the base Q4. In response to the switching signal, Q4 alternately opens and closes the current path from DC rail $V_{DC}$ to the reference level. Electrical energy is thus transferred to secondary side 22 of SMPS 20 by flyback action. Feedback winding L3, in combination with D5 and C4 return feedback voltage $V_s$ to the second input of error amplifier 170. $V_s$ is indicative of the demand from secondary side 22 of SMPS 20. Error amplifier 170 compares $V_s$ with reference voltage $V_b$ to generate an error voltage $V_e$. With Q4 turned on, current $I_p$ flows through L1 and $R_s$. A sense voltage indicative of current $I_p$ in L1 is thus developed across $R_s$ at the input to sense circuit 160. The output $V_1$ of sense circuit 160 varies as a function of current $I_p$. The output of comparator 150 is normally invariant, so that AND gate 130 is triggered to reset latch 140 only in response to a change in the output of PWM comparator 120. However, if $V_1$ exceeds reference voltage $V_a$, thereby indicating an over-current condition in which there is potentially damaging current in L1, then the output of comparator 150 changes, thereby disabling AND gate 130 and causing Q4 to turn off. During normal operation, PWM comparator 120 compares the $V_1$ with $V_e$ to generate a PWM control signal which is sent via AND gate 140 to reset input R of latch 140. Oscillator 11 supplies a clock signal to set input S of latch 140. Reset input R determines the width of each pulse triggered at output Q of latch 140 by the clock signal on Set input S. The resulting square wave signal on the base of Q4 is thus pulse width modulated according to the demand imposed by secondary side 22, thereby forming a duty cycle control loop. Secondary side 22 comprises secondary winding L2 on transformer T1 across which, during operation, a secondary voltage signal is generated. The voltage is rectified and smoothed by a diode D4 and a smoothing capacitor C3 to produce regulated DC power supply voltage $V_m$. It will be appreciated that there may be more than secondary winding on transformer T1 each producing a different power supply voltage level for driving different parts of the CRT display. The clock signal is synchronised to the line sync signal HSYNC input to the display in the interests of noise immunity. Line sync signal HSYNC is supplied to SMPS 20 as synchronisation signal HSYNC' via an inductive coupling (not shown) from the output of line scan circuit 40. The inductive coupling preserves electrical isolation between the primary and secondary sides of SMPS 20. Synchronisation signal HSYNC' is a stream of pulses with a DC value of zero. It will be appreciated that, in other embodiments of the present invention, line sync signal HSYNC may be coupled to SMPS 20 via a different coupling, such as an opto-electronic coupling, still maintaining electrical isolation between the primary and secondary sides SMPS 20.

Figure 3:
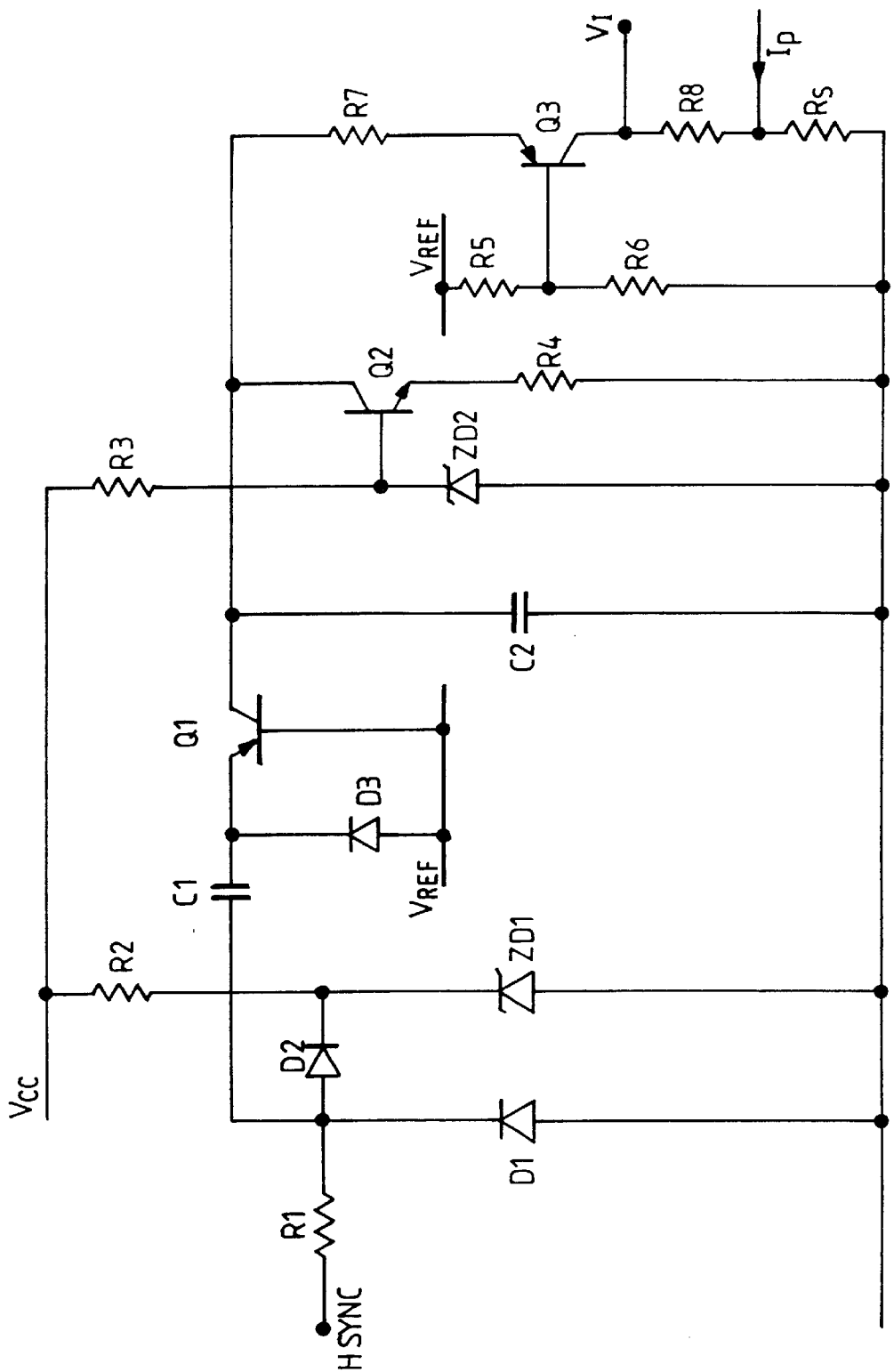
FIG. 3 is a block diagram of a current sense circuit for the switch mode power supply.

Referring now to FIG. 3, in sense circuit 160, HSYNC' is provided to a pair of diodes D1 and D2 via an input resistor R1. D1 removes any negative portion of the HSYNC' waveform. D2 in combination with a zener diode ZD1 normalise each pulse in HSYNC' so that the voltage range of the waveform arriving at a capacitor C1 in series with D1 is independent of the size of HSYNC'. A charge pump, formed by C1, a transistor Q1, and a diode D3, produces, at the collector of Q1, a current which is proportional to the frequency of HSYNC'. A capacitor C2, smooths the output of the charge pump. A resistor R3, a zener diode ZD2, a transistor Q2, and another resistor R4 collectively form a constant current sink connected to the output of the charge pump to sink some of the current from the charge pump. The constant current sink allows the response of sense circuit 160 to be trimmed. Resistors R5, R6, and R7 and a transistor Q3 collectively form a buffer to isolate $V_1$ from the charge pump. The current which passes through Q3 during operation generates a DC voltage across a resistor R8 and the sense resistor $R_s$. The second input of comparator 150 has a very high impedance and therefore draws negligible current. As mentioned earlier, the current $I_p$ is turned off when the voltage $V_i$ on the second input of comparator 150 exceeds a predetermined reference level $V_a$. Voltage $V_1$ is constituted by the voltage dropped across R8 and $R_s$ due to current flowing through Q3 and the voltage dropped across $R_s$ due to the passage of the current $I_p$ flowing through primary winding L1. Sense circuit 160 thus imposes a DC bias voltage, via the current flowing through Q3, on the voltage dropped across $R_s$ due to $I_p$. When the DC bias voltage is increased, comparator 150 detects an overcurrent condition and switches off $I_p$ at lower levels. Thus the maximum power level of the SMPS can be varied.

Figure 4:
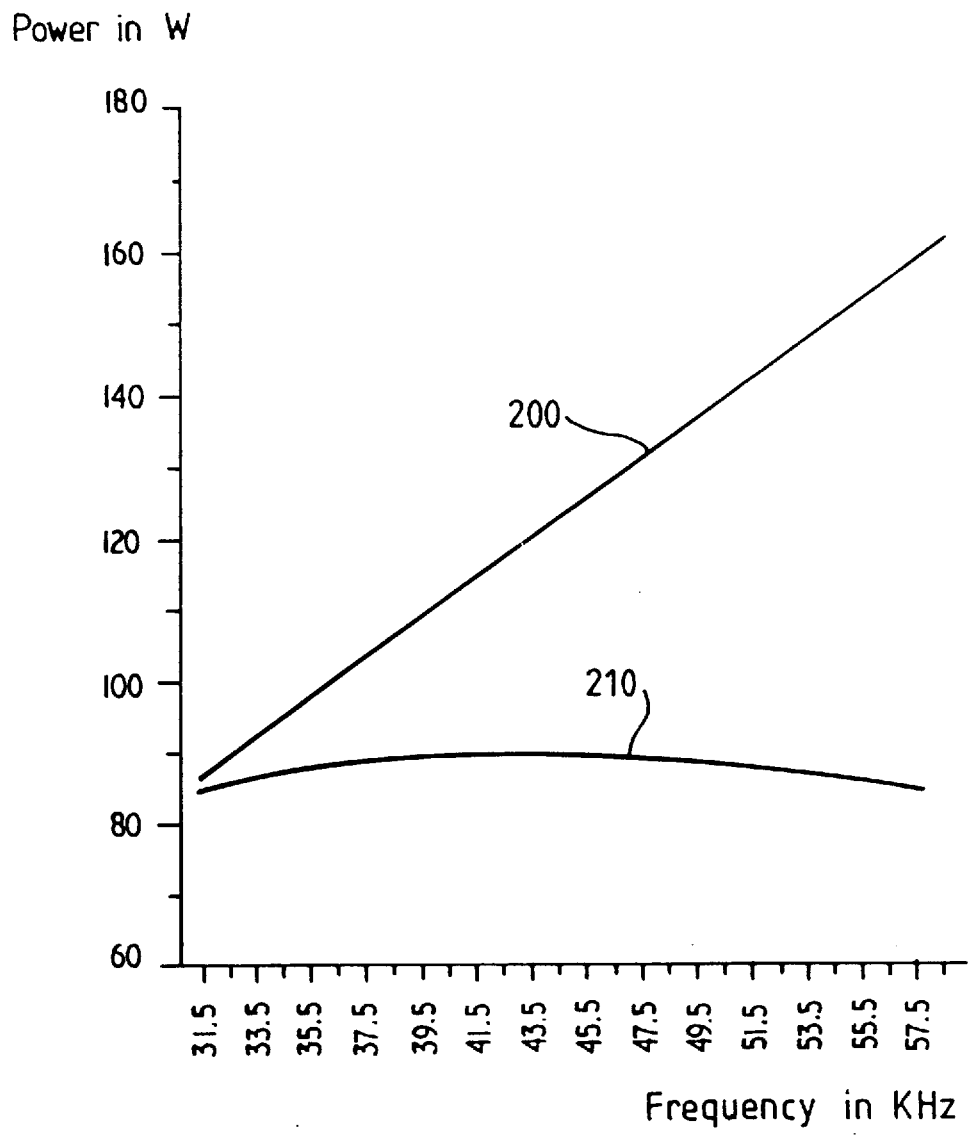
FIG. 4 is a graph of power limit in relation to frequency for the switch mode power supply.

The constant current sink of sense circuit 160 prevents the peak current limit imposed by comparator 150 from changing linearly with frequency. Peak power is proportional to the square of peak current. The charge pump generates a current which is directly proportional to frequency. This would allow higher peak power at lower frequencies. However, the current sink removes the DC bias at the lowest frequency. The gain of the charge pump is then set so that the peak power limit is the same at the lowest and highest frequency in the frequency range of HSYNC'. The variation in power limit between the lowest and highest frequencies of HSYNC' is relatively small (around 5 w). Referring now to FIG. 4, line 200 is indicates the variation in peak power limit with frequency of synchronisation signal HSYNC' for a conventional switch mode power supply in which sense circuit 160 is omitted and the voltage across $R_s$ is applied directly to the second input of comparator 150. Line 210 indicates the variation in peak power limit with frequency of synchronisation signal HSYNC' where sense circuit 160 is included in accordance with the present invention. It will be appreciated from line 210 that the present invention provides a switch mode power supply in which the variation in peak power limit with frequency of operation is negligible compared with the variation in peak power limit exhibited by conventional switch mode power supplies.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A switch mode power supply comprising: a transformer (T1); a switch (Q4) for alternately opening and closing a current path through a primary winding (L1) of the transformer in response to a pulse switching signal; an oscillator (110) for generating the switching signal and for synchronising the switching signal to a synchronisation signal (HSYNC') from an external source; a pulse width modulator (140) for varying the pulse width of the switching signal in dependence upon a feedback signal indicative of a load on the power supply; a current limiter (150) for turning off the switch to close the current path in response to current flowing in the primary winding exceeding a threshold; and compensation means (160) for varying the threshold in dependence upon the frequency of the synchronisation signal.

2. A power supply as claimed in claim 1, wherein the compensation means comprises a bias circuit for varying a bias voltage in dependence on the frequency of the synchronisation signal.

3. A power supply as claimed in claim 2, wherein the current limiter comprises a current sense element for generating a sense voltage signal indicative of the current flowing in the primary winding and the compensation means comprises a combining circuit for adding the bias voltage from the bias circuit to the voltage sense signal from the current sense element to produce a biassed output signal.

4. A power supply as claimed in claim 3, wherein the current limiter comprises a comparator for generating a current limit signal to turn off the switch in response to the biassed output signal from the combining circuit exceeding a reference level.

5. A cathode ray tube display comprising; a raster-scanned cathode ray tube; a drive circuit for generating a picture on the cathode ray tube in response to a video signal and line and frame synchronisation signals; and a switch mode power supply for supplying electrical power to the drive circuit, with the switching signal of the power supply being synchronised to the line synchronisation signal, said switch mode sower supply comprising a transformer; a switch for alternatively opening and closing a current path through a primary winding of the transformer in response to a pulse switching signal; an oscillator for generating the switching signal and for synchronising the switching signal to the line synchronisation signal; a pulse width modulator for varying the pulse width of the switching signal in dependence upon a feedback signal indicative of a load on the power supply; a current limiter for turning off the switch to close the current path in response to current flowing in the primary winding exceeding a threshold; and compensation means for varying the threshold in dependence upon the frequency of the synchronisation signal.

6. A cathode ray tube display as claimed in claim 5, wherein the compensation means comprises a bias circuit for varying a bias voltage in dependence on the frequency of the synchronisation signal.

7. A cathode ray tube display as claimed in claim 6, wherein the current limiter comprises a current sense element for generating a sense voltage signal indicative of the current flowing in the primary winding, and the compensation means comprises a combining circuit for adding the bias voltage from the bias circuit to the voltage sense signal from the current sense element to produce a biased output signal.

8. A cathode ray tube display as claimed in claim 7, wherein the current limiter comprises a comparator for generating a current limit signal to turn off the switch in response to the biased output signal from the combining circuit exceeding a reference level.

* * * * *

UNITED STATES PATENT AND TRADEMARK OFFICE
CERTIFICATE OF CORRECTION

PATENT NO.   : 5,831,837
DATED        : November 3, 1998
INVENTOR(S)  : David Coyne, et al.

It is certified that error appears in the above-identified patent and that said Letters Patent is hereby corrected as shown below:

Column 2, line 23: "the-primary" should read --the primary--

Column 6, line 30: "sower" should read --power--

Signed and Sealed this

Fourteenth Day of September, 1999

Attest:

Q. TODD DICKINSON

*Attesting Officer*     *Acting Commissioner of Patents and Trademarks*